FUEL SUPPLY CHAMBER FOR MULTI-BARREL CARBURETORS

Original Filed Sept. 5, 1951 4 Sheets-Sheet 1

INVENTOR.
OTTO HENNING
BY George P. Ericson
ATTORNEY

FUEL SUPPLY CHAMBER FOR MULTI-BARREL CARBURETORS

Original Filed Sept. 5, 1951 4 Sheets-Sheet 2

INVENTOR.
OTTO HENNING
BY George R. Ericson
ATTORNEY

FUEL SUPPLY CHAMBER FOR MULTI-BARREL CARBURETORS

Original Filed Sept. 5, 1951 4 Sheets-Sheet 3

INVENTOR.
OTTO HENNING
BY George P. Crisson
ATTORNEY

FUEL SUPPLY CHAMBER FOR MULTI-BARREL CARBURETORS

Original Filed Sept. 5, 1951 4 Sheets-Sheet 4

INVENTOR.
OTTO HENNING
BY George P. Ericson
ATTORNEY

United States Patent Office

Re. 24,742
Reissued Dec. 1, 1959

24,742

FUEL SUPPLY CHAMBER FOR MULTI-BARREL CARBURETORS

Otto Henning, Fern Park, Fla., assignor, by mesne assignments, to ACF Industries, Incorporated, New York, N.Y., a corporation of New Jersey Original No. 2,718,386, dated September 20, 1955, Serial No. 245,240, September 5, 1951. Application for reissue May 20, 1957, Serial No. 661,562

8 Claims. (Cl. 261—23)

Matter enclosed in heavy brackets [ ] appears in the original patent but forms no part of this reissue specification; matter printed in italics indicates the additions made by reissue.

This invention relates to multi-barrel and multiple carburetor arrangements for automotive engines and consists particularly in novel means for insuring circulation of fuel through the individual and separate carburetor bowls, even though a portion of the carburetor is not in normal operation, while retaining the advantages of separate bowls in cases of surging and tilting of the fuel.

In recent years there have been developed compound carburetion arrangements for automotive engines which consist in a plurality of complete carburetors, each usually a dual carburetor, one being the main carburetor for supplying the engine under all operative conditions and the other being an auxiliary carburetor for supplying fuel only under high speed operation. The principal advantage of these arrangements is that better economy and power are obtained during low speed operation without restricting the top speed of the vehicle.

It has been suggested to form the main and auxiliary carburetor into a compact multi-barrel unit retaining, however, individual constant level chambers for the main and auxiliary mixture barrels. In either case, I have found that since the auxiliary features of the carburetor may not be in constant operation, there is a danger of the fuel in the auxiliary fuel chamber standing long enough to cause sedimentation and gumming with consequent harmful effects, or vaporizing so that fuel is not promptly available for delivery through the auxiliary carburetor nozzles.

Consequently, the main object of the present invention is to provide a fuel bowl construction for a compound carburetor arrangement in which these disadvantages are avoided.

Another object is a multiple fuel bowl construction for a compound carburetor arrangement in which circulation in both fuel bowls is constantly maintained.

Another object is to provide for such circulation without eliminating the desirable aspects of compartmentalization in the fuel chambers, particularly the damping of surging and tilting of the fuel level during change of speed or direction, or when the carburetor is tilted.

These objects and other more detailed objects hereafter appearing are attained by the structure illustrated in the accompanying drawings in which.

Figure 1:
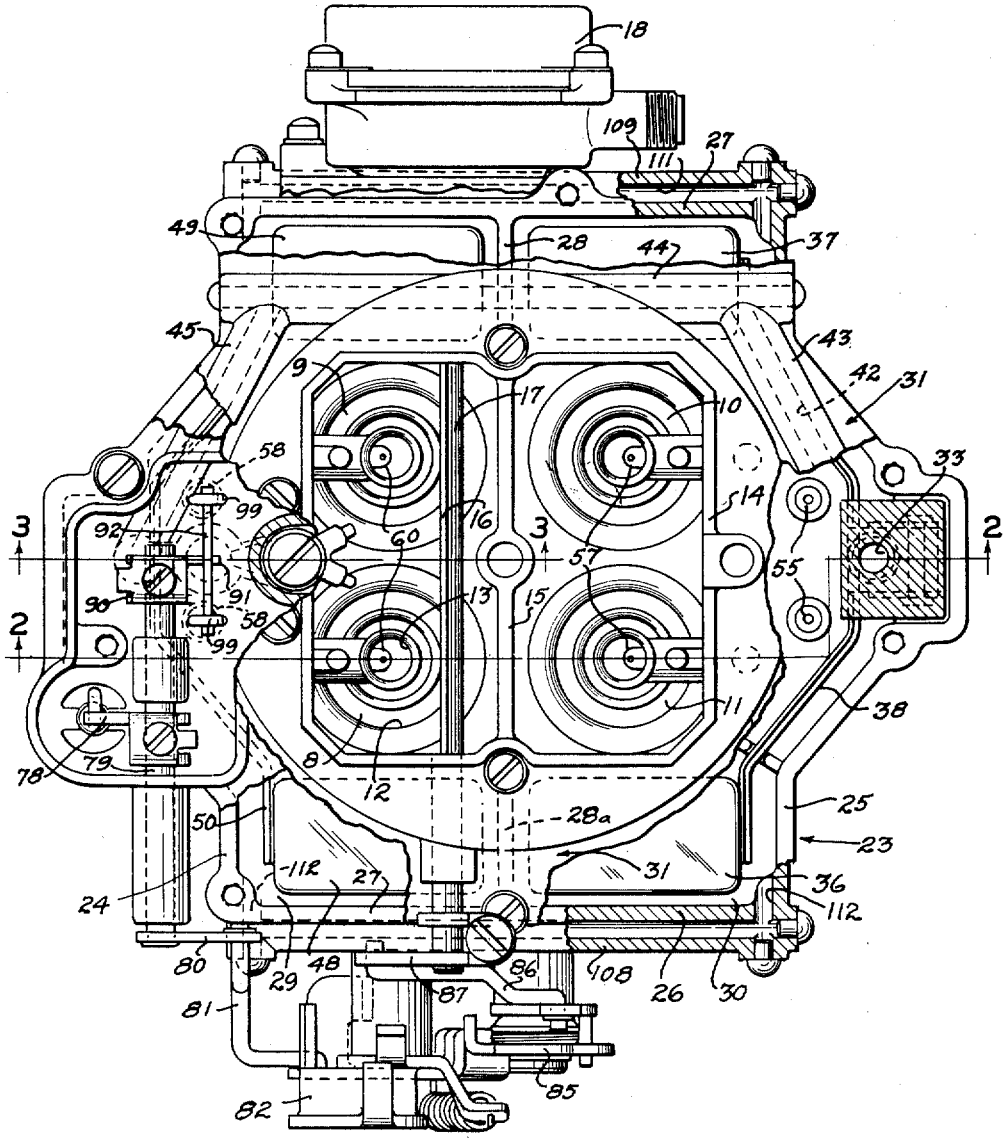
Fig. 1 is a top view of a four-barrel carburetor embodying the invention, portions being broken away and sectioned to illustrate the underlying parts.

The carburetor shown is of the four-barrel, downdraft type having mixture conduits 8, 9, 10 and 11, each with a main venturi tube, as at 12, and an inner or primary venturi tube, as at 13. At the top, the barrels merge into a common, rectangular air horn structure 14 having a partition 15. On the forward, main carburetor side of the partition there is pivotally mounted a rectangular choke valve 16, the shaft 17 of which extends into an automatic choke control housing 18, the details of which are not important in the present invention. The air horn terminates in a short, cylindrical portion for attachment of an air cleaner (not shown). A continuous shaft 19 extends across the lower portions of the two forward main barrels 8 and 9 and mounts a butterfly throttle valve 20 in each barrel. A continuous shaft 21 extends across the lower portion of the two rear auxiliary barrels 10 and 11 and mounts in each barrel a butterfly throttle valve 22.

Entirely surrounding the cluster of barrels is a fuel bowl structure 23 having forward and rear walls 24 and 25 and side walls 26 and 27. Partitions 28 and 28a projecting sidewardly from the barrels divide the fuel bowl structure into a pair of substantially isolated, approximately semi-circular constant level chambers 29 and 30, each extending half way around the carburetor. Air horn structure 14 is formed integral, as is customary, with the bowl cover structure 31 which entirely covers the fuel chambers. A threaded fuel inlet boss 32 is formed at the rear center of cover structure 31 for attachment of a fuel line leading from the usual fuel pump. An L-shaped passage 33 (Fig. 2) connects with the threaded connection and, at its lower extremity, mounts a needle valve seat member 34, which receives a needle valve 35. This valve is controlled by a pair of floats 36 and 37 rigidly secured together by a yoke 38 to form, in effect, a single float system. Yoke 38 has a central lip 39 which supports needle valve 35 and is pivoted at 40 to depending bifurcations 41 formed on the bowl cover structure 31. The arrangement is such as to maintain a substantially constant level of fuel in auxiliary fuel chamber 30.

A cross passage 42 connects with fuel inlet passage 33 and leads through bosses 43, 44 and 45, formed on the bowl cover structure, with an inlet port formed centrally above main fuel chamber 29 and opposite inlet passage 33 and mounting a needle valve seat member 46 which receives needle valve 47. Valve 47 is controlled by floats 48 and 49 rigidly tied together by a yoke 50, supporting and operating needle valve 47 in the same manner as floats 36 and 37, previously mentioned, operate needle valve 35. Thus, the fuel level in the rear or auxiliary fuel chamber 30 is controlled by one set of floats 36, 37, while the fuel level in the forward or main constant level chamber 29 is controlled by an independent set of floats 48, 49.

Figure 2:
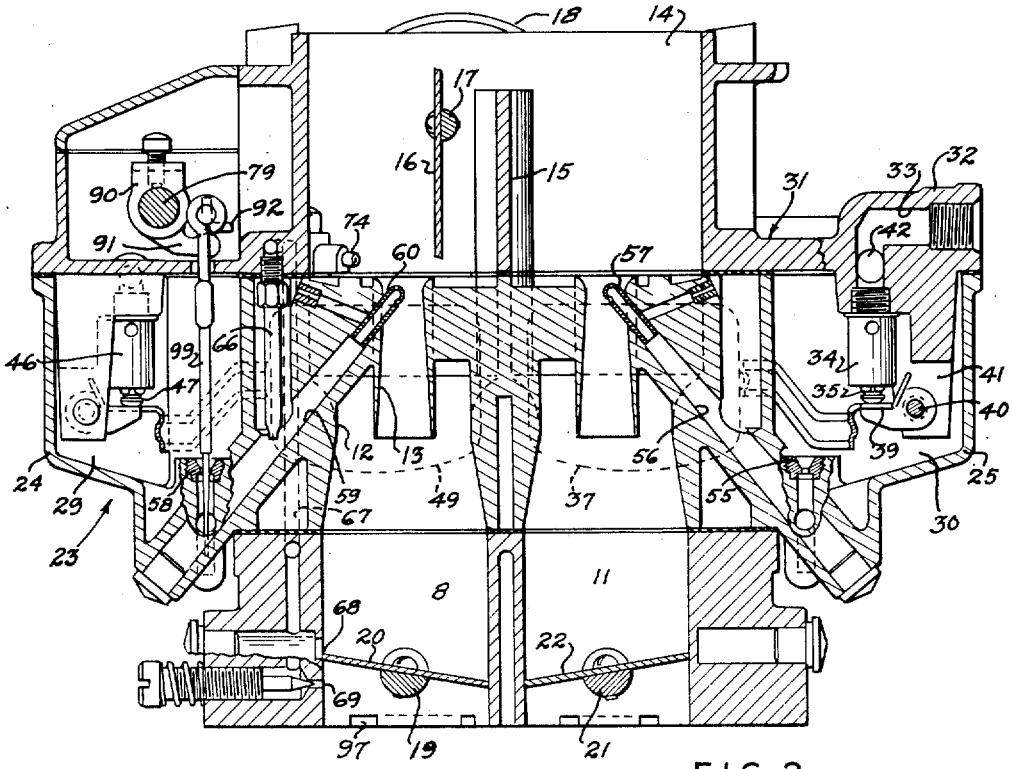
Fig. 2 is a vertical, transverse section on line 2—2 of Fig. 1.
Figure 3:
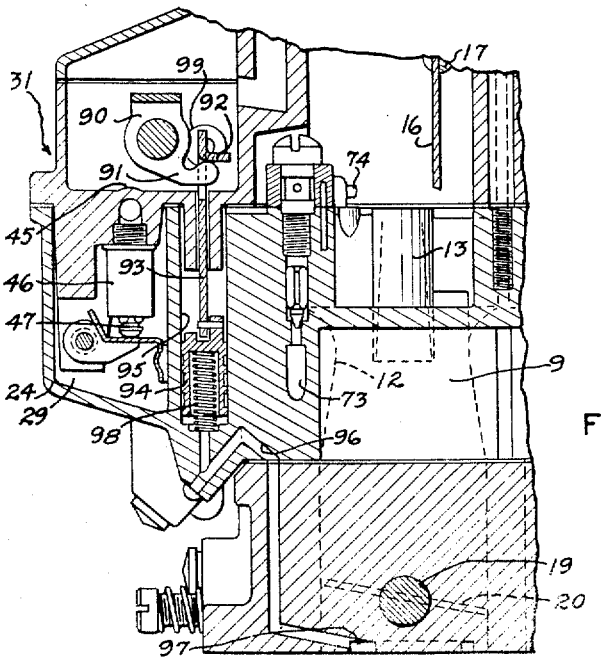
Fig. 3 is a similar section on line 3—3 of Fig. 1.

Formed in the central, bottom portion of auxiliary fuel chamber 30 and nearer the inner wall thereof than the rear wall 24, as will be evident from Fig. 2, are a pair of metering orifice elements 55 which connect with inclined auxiliary fuel passages 56, which open into the primary venturi tubes in auxiliary barrels 10 and 11 by means of nozzles 57. In a corresponding portion of the forward, main constant level chamber are located metering orifice elements 58 which meter fuel to inclined main fuel passages 59, which open through nozzles 60 into the primary venturi tubes in main mixture conduits 8 and 9.

Figure 4:
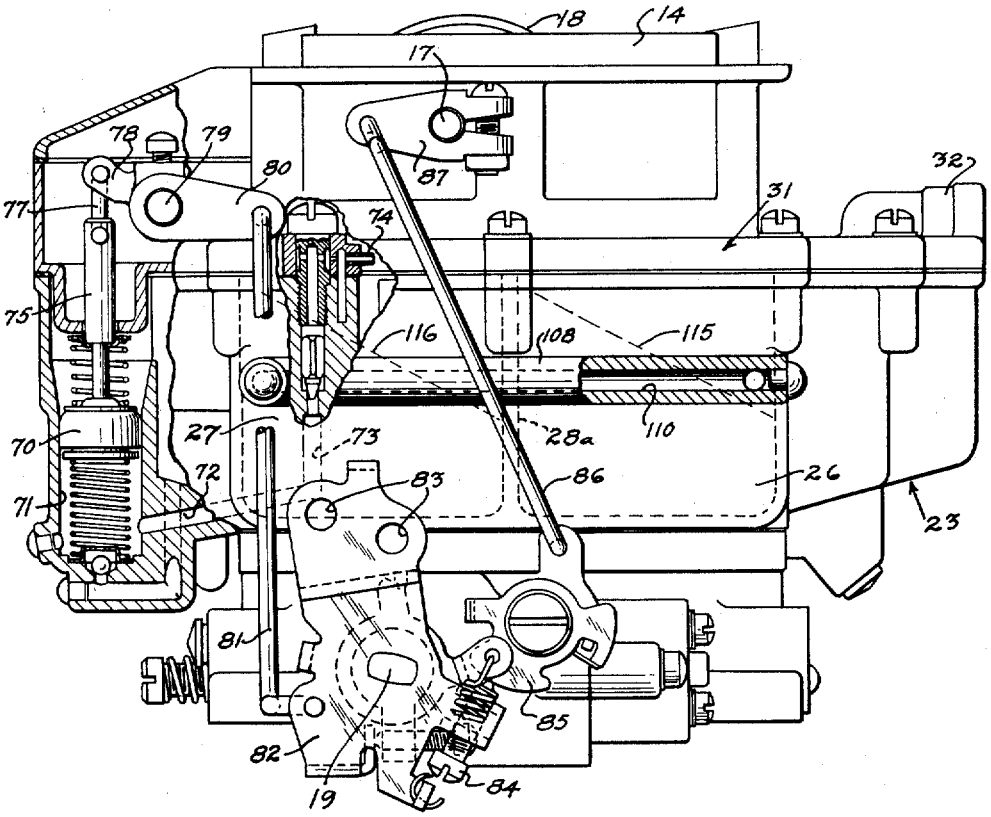
Fig. 4 is a side view of the carburetor with portions broken away and sectioned.

The two forward mixture conduits 8 and 9 and constant level chamber 29 form a dual carburetor for supplying the fuel needs of the engine under most conditions. For this purpose, individual idling systems 66 and 67 connect main fuel passages 59 to ports 68 and 69 adjacent and posterior to the edges of main throttle discs 20 when closed. The two main barrels are also supplied with accelerating fuel by means of the pump 70, 71, discharge passages 72 and 73, and outlet nozzles 74 (Fig. 4). The pump is actuated by means of a piston rod 75 connected by link 77 to an arm 78 rigid with a countershaft 79 pivotally mounted above bowl cover structure 31. Countershaft 79 is operated from the throttle valve by means of a lever 80 rigid with the countershaft and a link 81 connecting this lever and a crank 82 rigid with one end of main throttle valve shaft 19. This lever has a pair of holes 83 for connection, as is well known, to the accelerator pedal, and also carries fast idle adjustment screw 84 which contacts fast idle cam 85 connected by link 86 to lever 87 rigid with choke shaft 17. The fast idle mechanism limits the closing movement of the main throttle valves to the fast idle position when the choke valve is closed or partially closed.

Also rigid with countershaft 79 (Fig. 2) is a small arm 90 which has a finger 91 underlying a horizontal cross bar 92 which projects oppositely from a stem 93 connected at its lower extremity to a piston 94 working in a cylinder 95. The cylinder beneath the piston is connected by a passage 96 to a cross port 97 which opens into both main mixture barrels 8 and 9 posterior to the throttle valves therein. Piston 94 is urged upwardly by a coil compression spring 98. Carried at the ends of cross bar 92 are a pair of metering pins 99 which cooperate with main metering orifices 58. These metering pins and their control constitute a familiar step-up arrangement and are further described and claimed in Read Patent No. 2,208,702 and Cloedy et al. Patent No. Re. 21,610.

In the present instance, auxiliary mixture conduits 10 and 11 are provided only with main fuel nozzles, the idling systems, accelerating pump, and step-up devices being omitted.

Figure 5:
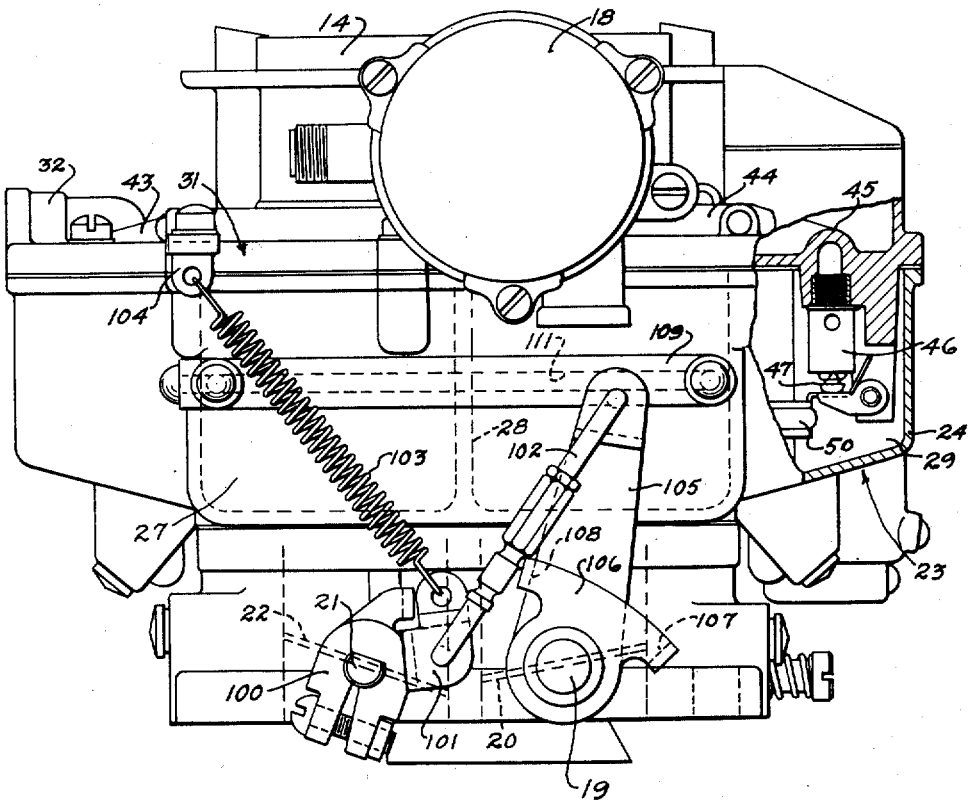
Fig. 5 is an elevation of the opposite side of the carburetor.

Auxiliary throttle valves 22 are operated from the main throttle valves by the mechanism illustrated in Fig. 5, which is on the opposite side of the carburetor from the parts shown in Fig. 4. On the end of auxiliary throttle shaft 21 there is secured an arm 100 which has an angular ear 101 perforated to receive an adjustable link 102 and the end of a coil tension spring 103. The other end of the spring is anchored to an eye 104 on the upper part of the carburetor body. The opposite end of link 102 is pivoted to the upper end of a lever 105, which is loosely pivoted about main throttle shaft 19. Tightly secured to the end of the main throttle shaft is an arm 106 having spaced, inward lugs 107 and 108 for forming a two-way lost motion connection between the main throttle valve and lever 105.

In operation of the throttle controls, the main throttle valves are operated from the accelerator pedal through lever 82 shown in Figs. 1 and 4. When these main throttles are approximately one-half open, ear 107 engages the righthand edge of lever 105, whereupon, further opening of the main throttle valve acts through link 102 and arm 101 to open auxiliary throttle valves 22 against tension spring 103. This causes the auxiliary mixture conduits to supply additional fuel mixture, as is required for high speed operation. This particular operation of the throttle valves is not essential, and other arrangements may be substituted, for instance, to cause the auxiliary throttle valves to respond to mixture flow or suction so that these valves will not be opened at low speed operation, irrespective of the position of the main throttle valves.

Consequently, it will be evident that whenever the auxiliary throttle valves are closed, no fuel will be drawn through auxiliary fuel nozzles 57. Even were auxiliary idling systems provided, the operation thereof would not cause adequate circulation in the auxiliary fuel bowls. In order to produce circulation in auxiliary constant level chamber 29 at such times, there are formed on the opposite sides of the fuel bowl structure, horizontal ribs 108 and 109 which are drilled to form cross passages 110 and 111. Passage 110, at its ends connects, by means of cross bores 112, with both constant level chambers 29 and 30 substantially at or below the normal fuel level therein. Cross bores 112 are located as near as possible to front wall 24 and rear wall 25, respectively. Cross passage 111 at the other side of the carburetor is similarly positioned and constructed. The ends of passages 110 and 111 are plugged as shown so that no fuel can escape therefrom. Accordingly, during normal operation, fuel will be transferred from bowl to bowl through the cross passages so that even though only the main mixture conduits should be in operation over a considerable period of time, some fuel will be drawn from auxiliary constant level chamber 30, resulting in sufficient circulation to avoid excessive sedimentation, vaporization, and gumming.

However, in case of suddent acceleration or deceleration of the vehicle, or of tilting thereof, the fuel in the individual constant level chambers will assume an angle, as indicated by dotted lines 115 and 116 in Fig. 4. It will be evident, accordingly, that the cross passage will be, at least momentarily, cut off from one of the chambers, and will not function to transfer fuel therebetween. Therefore, the effect of surging or tilting will be greatly minimized. Furthermore, the advantages of an adequate fuel supply in the constant level chambers are obtained while the compartmentalization reduces the variations of the fuel level due to surging and tilting. The cross passage should open into different and preferably opposite outer portions of the fuel chambers to insure that one end of the passage will be uncovered under opposite surge or tilt conditions. Connecting passages 110 and 111 will function satisfactorily at any level below the outlet tips of auxiliary nozzles 57, that is, below, substantially at, or even slightly above the normal fuel level. The constant agitation of fuel in the bowls during operation of the engine will insure circulation through the passages and will prevent build-up of the fuel level in a bowl sufficiently to spill over the nozzles.

Figure 6:
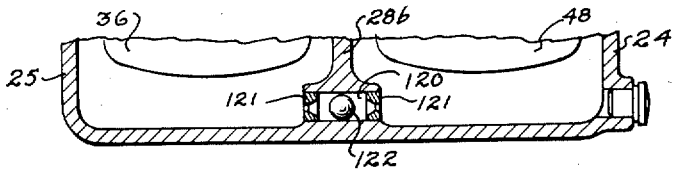
Fig. 6 is a detail section through portions of the fuel bowls and illustrating a modification.

In Fig. 6, a check valve arrangement is substituted for the passages 110, 111 of the previous form. Near the bottom of the partition 28b, corresponding to partitions 28 and 28a, there is provided a valve chamber 120 having an apertured plug 121 at each end. A ball check 122 is loosely recessed in the chamber and, during normal operation, permits free circulation of fuel between the constant level chambers. In case of a surge or a tilt, the ball will seat against one or the other of the apertured plugs to, at least momentarily, cut off the cross passage through the partition.

The principal features of the invention may be applied where the carburetors are separately formed, as well as in the integral four-barrel arrangement and, of course, the number of barrels may be reduced or increased. Likewise, exact location of the restricted cross passages may be varied. The invention may be modified in these and other respects as will occur to those skilled in the art and exclusive use of all modifications as come within the scope of the appended claims is contemplate.

I claim:

1. Carbureting means for internal combustion engines comprising a plurality of mixture conduits, an isolated constant level fuel chamber for each conduit and a fuel supply passage connecting the same to the corresponding conduit, a fuel inlet opening into each chamber and an individual float and needle valve mechanism controlling each inlet, means for adjusting the fuel delivery from said conduits for supplying fuel from at least one of said conduits under certain operative conditions and from another of said conduits under other operative conditions, and a pair of ducts on opposite sides of said chambers and connecting portions of said chambers adjacent opposite remote end walls thereof for maintaining transfer of fuel between said chambers under normal operating conditions while resisting transfer of liquid fuel through said ducts when the fuel level in said chambers is abnormally tilted.

2. In a multi-barrel carburetor, main and auxiliary downdraft mixture conduits disposed side by side, fuel bowl structure extending entirely around said conduits, partitions extending sidewardly from said conduits and dividing said bowl structure into substantially isolated forward main and rear auxiliary fuel chambers, a fuel inlet and individual constant level control mechanism for each chamber, a main fuel nozzle extending rearwardly from the inner portion of said main fuel chamber, an auxiliary fuel nozzle extending forwardly from the inner portion of said auxiliary chamber, a manual throttle valve controlling the discharge from said main mixture conduit, an auxiliary throttle controlling said auxiliary conduit, control means for opening said auxiliary throttle valve during operation after said main throttle is substantially opened, and passage means connecting opposite remote outer portions of said chambers for maintaining circulation of liquid fuel in both chambers during operation, there being substantial portions of said chambers vertically and horizontally of said ducts separated from each other by imperforate walls to resist transfer of fuel between said chambers in case of surging and tilting of the fuel.

3. In a carburetor having induction conduit means and a plurality of constant level fuel supply chambers for said conduit means, said chambers being separated by partition means, and duct means having its terminals defining ports opening into said chambers and providing a fluid connection therebetween, said duct means lying in a plane below the normal fuel level thereby providing for fuel transfer between the chambers during normal fuel conditions, said duct and its openings being positioned relative to said normal fuel level to expose one of said duct openings above the fuel during abnormal fuel surging so as to prevent transfer of fuel through the duct means under such abnormal surging conditions, said duct terminal ports being spaced a substantial distance outwardly from each side of said partition.

4. In a carburetor having induction conduit means and a plurality of constant level fuel supply chambers for said conduit means, the combination of duct means between said chambers including outlets for said duct means to said chambers positioned to provide for fuel transfer between said chambers through said duct means at normal fuel levels, but positioned to be inoperative to provide for fuel transfer during surging or tilting with any one of said outlets exposed, each of said outlets being positioned with respect to the corresponding chamber to be above displaced fuel levels caused by acceleration and deceleration forces acting on the fuel or by inclinations of the carburetor in opposite directions.

5. In a carburetor, the combination of a mixture conduit, a constant level fuel bowl, a fuel supply passage leading from said bowl to said conduit, a partition dividing said bowl into a plurality of chambers, and means interconnecting said chambers near the normal fuel level therein providing for fuel transfer therethrough to intermingle the fuel in the two chambers, said means comprising a passage between said chambers, and connections between said passage and said chambers located in said chambers to be uncovered by the fuel therein and thereby interrupt fuel transfer between said chambers during accelerations and decelerations or changes from a level carburetor position producing similar fluid displacements in said chambers.

6. In a carburetor having induction conduit means, a pair of independent fuel bowls and independent means for controlling the fuel supply for each bowl, the combination of duct means connecting said bowls near the fuel levels therein, and outlets for said duct means opening in opposite remote, outer portions of said independent fuel bowls so as to provide for fuel transfer between said bowls when said outlets are at or below the fuel level in both said bowls, but positioned to be inoperative for transfer of fuel during a surge of fuel when either one of said outlets is above the fuel level in one of said bowls.

7. In a carburetor having induction conduit means, a pair of independent fuel bowls and independent means for controlling the fuel supply for each bowl, the combination of duct means including outlets connecting with said bowls near the fuel levels therein, said outlets for said duct means opening in the opposite, remote, outer portions of said independent fuel bowls and being operatively positioned to provide for fuel transfer between said bowls when the fuel in said bowls is substantially at the normal level but positioned to be inoperative to provide for fuel transfer with either one of said outlets above displaced fuel levels caused by acceleration or deceleration forces acting on the fuel or by inclinations of the carburetor.

*8. A charge forming device for internal combustion engines comprising in combination primary and secondary mixture passages adapted to supply combustible mixture to the engine intake, primary and secondary throttle valves controlling the flow of fuel mixture therefrom, primary and secondary fuel chambers associated with said mixture passages, a plurality of main fuel inlets one of which supplies fuel to the primary mixture passage and the other to the secondary mixture passage, a fuel passage leading from one of said inlets to the primary fuel chamber, a second fuel passage leading from the other of said inlets to the secondary fuel chamber, a passage for connecting the primary and secondary fuel chambers and orifices positioned substantially at the normal fuel level for connecting said passage with each of said fuel chambers.*

References Cited in the file of this patent or the original patent

UNITED STATES PATENTS

| | | |
|---|---|---|
| 2,212,926 | Wirth | Aug. 27, 1940 |
| 2,420,925 | Wirth | May 20, 1947 |
| 2,628,826 | Worden | Feb. 17, 1953 |